(12) United States Patent
Vonholm et al.

(10) Patent No.: US 7,194,430 B2
(45) Date of Patent: Mar. 20, 2007

(54) SHOPPING AND PAYMENT/CREDIT HANDLING

(75) Inventors: Christian Vonholm, Billingstad (NO); Stian Valentin Knutsen, Nesbru (NO)

(73) Assignee: Scan & Pay AS, Billingstad (NO)

( * ) Notice: Subject to any disclaimer, the term of this patent is extended or adjusted under 35 U.S.C. 154(b) by 639 days.

(21) Appl. No.: 10/239,937

(22) PCT Filed: Mar. 27, 2001

(86) PCT No.: PCT/NO01/00133

§ 371 (c)(1),
(2), (4) Date: Feb. 6, 2003

(87) PCT Pub. No.: WO01/73580

PCT Pub. Date: Oct. 4, 2001

(65) Prior Publication Data

US 2003/0149663 A1    Aug. 7, 2003

(30) Foreign Application Priority Data

Mar. 27, 2000 (NO) ................................. 20001586

(51) Int. Cl.
*G06Q 30/00* (2006.01)
(52) U.S. Cl. ......................................... 705/26; 705/21
(58) Field of Classification Search ................. 705/26, 705/27, 16, 21
See application file for complete search history.

(56) References Cited

U.S. PATENT DOCUMENTS 5,220,501 A    6/1993 Lawlor
5,255,307 A *  10/1993 Mizikovsky .............. 455/432.1
5,315,511 A    5/1994 Matsuura (Continued)

FOREIGN PATENT DOCUMENTS

EP    1 016 999 A2    7/2000
RU    2103733          1/1998
WO    WO 96/09592     3/1996
WO    WO 01/25985     4/2001

OTHER PUBLICATIONS

Anon., "Portable Self-Checkout Retail System," IBM Technical Disclosure Bulletin, vol. 35, No. 1A, pp. 315-318, Jun. 1992.*
Byrnes, A., "Fujitsu Puts Brave Face on First Ever Loss as It Puts Its Advanced Research on Show," Computergram International, Nov. 16, 1992.*

(Continued)

*Primary Examiner*—Nicholas D. Rosen
(74) *Attorney, Agent, or Firm*—Finnegan, Henderson, Farabow, Garrett & Dunner, L.L.P.

(57) ABSTRACT

The invention relates to a method and a system for implementing a sequence for sales and provision of information at a retail establishment or in a similar area where a local radio communication is established between a central computer unit (30) and mobile terminals (20), equipped with bar code readers. For implementation of the sequence, the unit (30) first receives an initiation order from a terminal (20), transmitted via a telecommunication network via a second unit (40) at a service provider. The telecommunication is then disconnected, and local radio communication is employed for the communication between the customer's terminal and the shop's unit (30). A unique identification is created for the sequence, and a registration list is established associated with the sequence. The unit (30) further receives data input by means of the bar code reader in the terminal (20), comprising information (101) concerning each item. The registration list is updated with data associated with the goods, and these data can also be displayed on the terminals (20). Finally a payment or credit transaction is initiated based on the updated registration list and the identification for the sequence.

21 Claims, 3 Drawing Sheets

U.S. PATENT DOCUMENTS

| | | | |
|---|---|---|---|
| 5,640,002 A * | 6/1997 | Ruppert et al. | 235/462.46 |
| 5,920,847 A | 7/1999 | Kolling et al. | |
| 5,923,735 A | 7/1999 | Swartz et al. | |
| 5,928,002 A | 7/1999 | Loibl | |
| 6,577,861 B2 * | 6/2003 | Ogasawara | 455/419 |
| 6,584,309 B1 * | 6/2003 | Whigham | 455/414.1 |
| 6,587,835 B1 * | 7/2003 | Treyz et al. | 705/14 |
| 6,604,681 B1 * | 8/2003 | Burke et al. | 235/383 |
| 2001/0024174 A1 * | 9/2001 | Turner | 342/465 |
| 2002/0065728 A1 * | 5/2002 | Ogasawara | 705/23 |
| 2005/0086164 A1 * | 4/2005 | Kim et al. | 705/40 |

OTHER PUBLICATIONS

Terry, L., "Putting the Power in Shoppers' Hands (Self-Scanning System)" (Abstract), ID Systems European Edition, vol. 2, No. 4, p. 25, Sep. 1994.*

Zimmerman, D., "Sam's: More Customer Scanners," HFN, The Weekly Newspaper for the Home Furnishing Network, vol. 71, No. 27, p. 12, Jul. 7, 1997.*

Anon., "Swipe Your Shopping," Times, Mar. 11, 1998.*

Pepe, M., "Trio Takes Next Step in Portable Shopping," Computer Reseller News, No. 844, p. 125, May 31, 1999.*

Smith, R:, "Getting down to Specifics," Telephony, Sep. 27, 1999.*

* cited by examiner

SHOPPING AND PAYMENT/CREDIT HANDLING

The invention relates to a method and a system for implementing sales and provision of information in an area, for example a retail establishment. The method and the system may also comprise payment or credit provision.

Sales in shops, particularly retail sales in self-service shops, are traditionally carried out by the customers collecting the desired items and bringing them to a cash desk, where the price of the items is registered and added up to a total amount, whereupon the customer pays or settles up in another way.

An object in this kind of trade is generally to reduce as far as possible the time required for the various steps involved in the trade. It is also an object to simplify the operations performed by the customer and possibly the operator at the cash desk. A further object is to simplify any marking of goods in the shop, and the operations which have to be performed for changing the prices of the goods. A general object is also to reduce the staff required in the shop.

A special object is to avoid manual entering of number codes, in order thereby to save time and reduce the risk of error.

A further general object is to reduce the extent and the costs of equipment employed in the trade, for example by the customer using equipment which he/she already possesses.

Technical developments have yielded a number of simplifications and rationalisations with regard to retail trade. Thus a number of solutions are known in the prior art where the above-mentioned objects have to some extent been achieved.

Instead of registering the price of each item manually, it is normal practice today for the checkout staff to register the identity or type of the goods by means of an optical bar code, thus indicating the price by means of electronic inquiry in a computer system. A variety of solutions are also commonly used for electronic payment, particularly with a payment or credit card.

In the prior art, moreover, technical solutions are known involving a further rationalisation of commodity trade. A greater degree of self-service, where the task of registering the goods is transferred to the customer, can be achieved by equipping each customer with a device which can read a bar code on each item. An example of such a system is disclosed in U.S. Pat. No. 5,928,002.

U.S. Pat. No. 5,923,735 discloses a system where, for registering goods, the customer employs a hand-held terminal consisting of the combination of a bar code reader and a mobile telephone. When using this device, the customer establishes a mobile communication connection between the terminal and a computer in the store. While shopping, the customer registers bar code data from various items. These data are transferred via the mobile communication connection to the store computer, where a transaction file linked to the customer is updated, and where information concerning the item concerned, including information on the price, is transferred back to the terminal. The transaction is completed at a cash desk, where, instead of registering the items again, the staff retrieve data from the transaction file into the cash register. Payment is then made. The customer finally terminates the established mobile communication connection between the terminal and the store computer.

A first drawback of the above solution is that a mobile communication channel requires to be maintained from the start of the transaction to its conclusion. With the use of traditional mobile telephony, this entails substantial costs for the customer.

A second drawback is that the payment settlement is carried out in the ordinary way, under the control of the cashier. This entails manual resource use and manpower requirements, with very little saving of time.

An object of the invention is to provide a method as mentioned in the introductory part of the following, independent claim 1, and which does not have the above-mentioned drawbacks. This object is achieved by the features set forth in the characterising part of the independent claim 1.

A further object of the invention is to provide a system as mentioned in the introductory part of the following, independent claim 9, and which does not have the above-mentioned drawbacks. This object is achieved by the features set forth in the characterising part of the independent claim 9.

An object of the invention is also to provide a computer program for implementing the method according to the invention. This object is achieved by the features indicated in claim 17.

A further object is to provide a computer device for implementing the method according to the invention. This object is achieved by the features indicated in claim 18.

Further objects and advantages are achieved by the features indicated in the dependent claims.

The invention will now be described in more detail by means of an embodiment illustrated in the drawings, in which.

Figure 1:
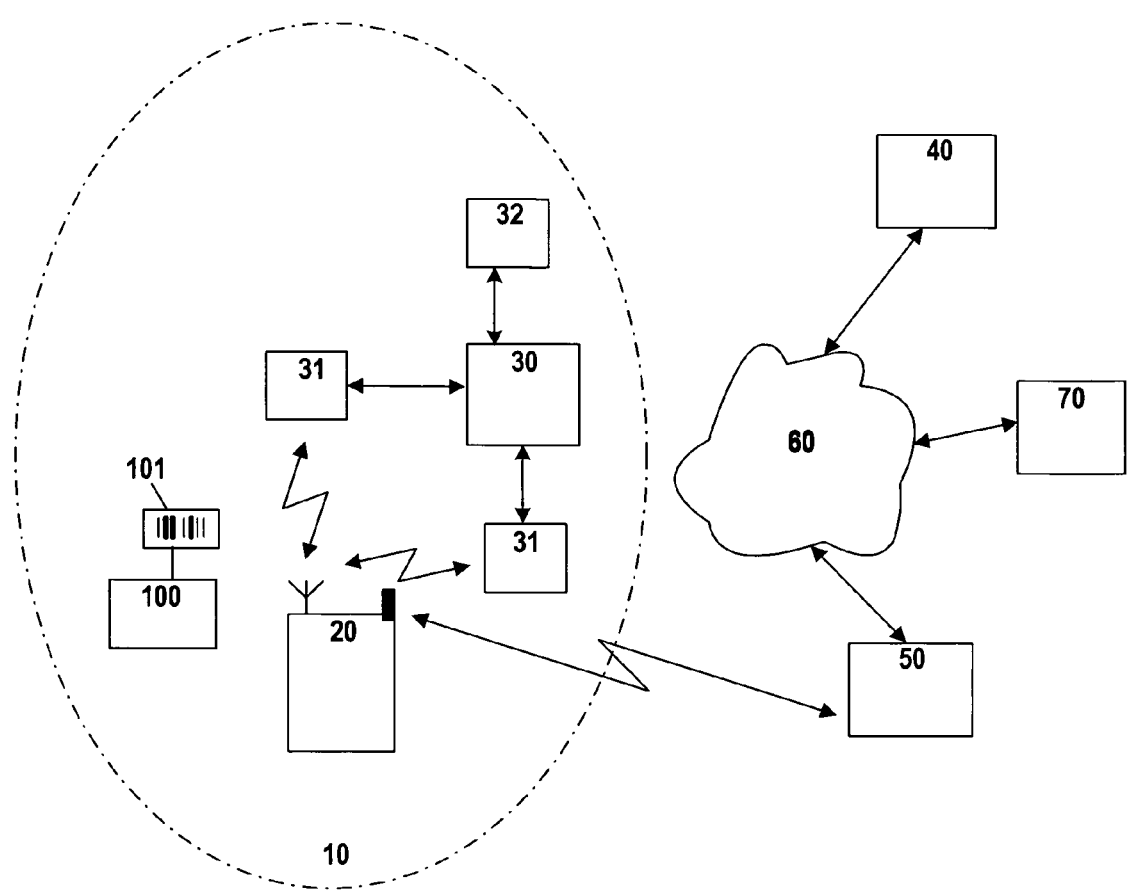
FIG. 1 is a block diagram illustrating a system in which a method according to the invention can be employed.

The block diagram in FIG. 1 illustrates a system in which a method according to the invention can be employed.

The boundary line 10 here indicates a geographical area which, for example, may be the area of a shop offering goods 100. In this presentation the term goods should also be understood to include services.

An essential feature of the invention is that the area 10 is at least partly the coverage area for a local communication network where at least one local communication device 31 is arranged to communicate with mobile communication devices 20, and that in the area 10 information 101 linked to the goods 100 on offer is available or is displayed.

The local communication network is preferably a network which employs a two-way radio-based communication. The network must at least offer two-way local communication between a first transceiver and a second transceiver, where the second transceiver is composed of a mobile communication unit 20. For this purpose use is preferably made of a radio link according to the Bluetooth specification. Bluetooth specifies a radio technology for wireless communication over a restricted area, usually up to 10 metres, employing the 2.4–2.5 GHz band.

The area 10 may, for example, be the area of a self-service shop. In the shop goods or types of goods 100 are offered which are connected to information 101 associated with the goods. The information is preferably provided in the form of an information carrier with a bar code identification. The information carrier may be applied to the item or placed in a location associated with the item, for example a shelf in the shop. If the item is a physical object, it may just as easily be located outside as inside the area 10.

In connection with the area 10 there is located a first, central unit 30. This comprises a computer device with processing, storage and input/output units. The unit 30 comprises communication equipment for communicating with a telecommunication network 60. Connected to the unit 30 is at least one communication device 31, arranged for local data communication with mobile communication units 20 which are placed locally in the shop 10. Each local communication device 31 preferably comprises a transceiver according to the Bluetooth specification, arranged to communicate with the mobile communication units 20 as described below.

The unit 30 is also advantageously connected to one or more printer devices 32, especially printers arranged to print out receipts which will be supplied to the customer after the transaction is completed.

The mobile communication unit 20 with which the customer is equipped is preferably composed of a hand-held terminal. The terminal 20 comprises mobile communication equipment arranged for communication in a mobile telephone network, preferably in the form of a GSM telephone module, reading equipment for reading information associated with an item, preferably in the form of an optical, infrared bar code reader, and local communication equipment for communicating in the local communication network, preferably a Bluetooth transceiver.

Figure 2:
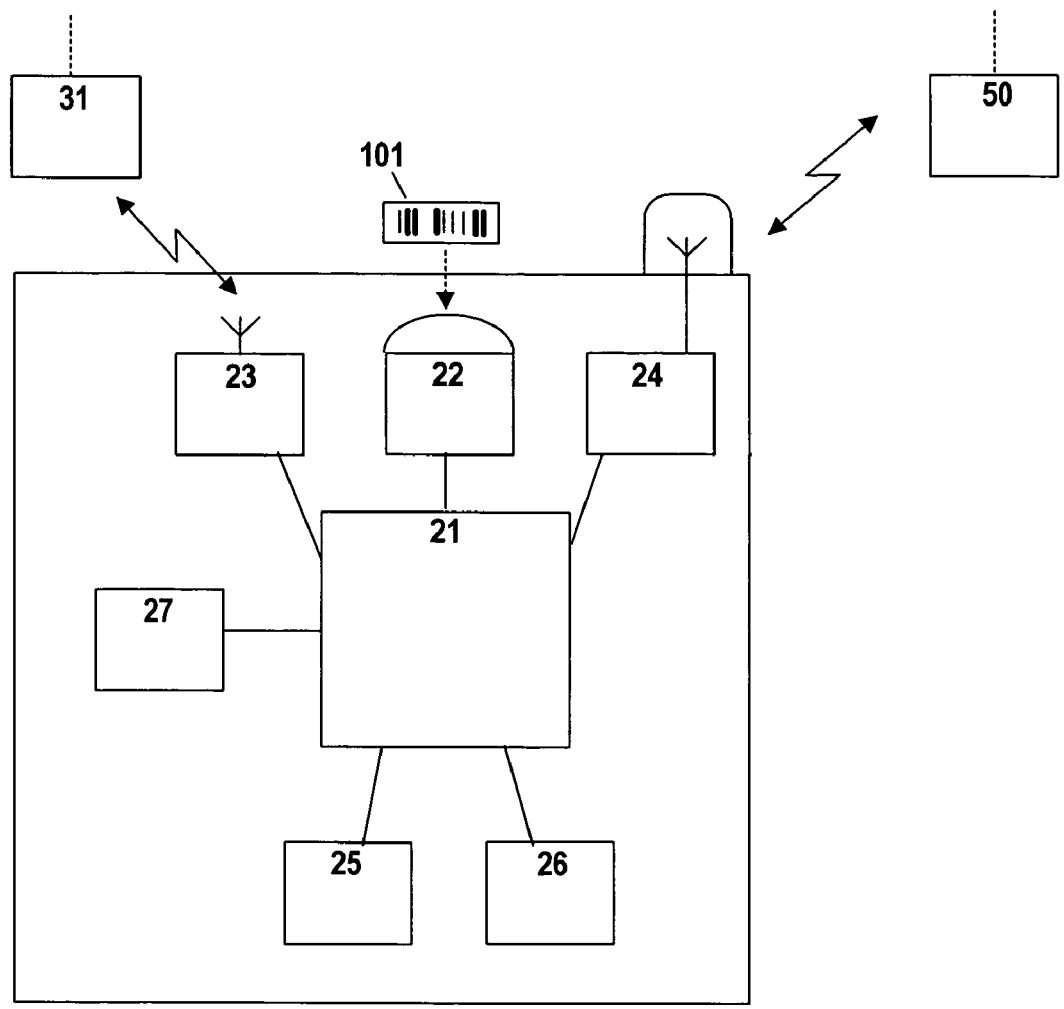
FIG. 2 is a simplified block diagram illustrating the components in a mobile communication unit which forms part of the system in FIG. 1.

The simplified block diagram in FIG. 2 illustrates the principle construction of a terminal 20. The terminal 20 comprises a central control unit 21, a bar code reader 22, a Bluetooth transceiver 23, a GSM module 24, a display 25, a keyboard 26 and a subscriber identification module (SIM) 27. The terminal 20 is therefore composed of a known per se GSM mobile telephone equipped with Bluetooth local communication and which is further equipped with an optical bar code reader for input of bar code data. Alternatively, the terminal 20 may be composed of a hand-held computer, a so-called PDA, preferably equipped with a GSM communication card 24 and otherwise with the same elements as those mentioned above.

A second unit 40 is composed of a computer device in the form of a server at a service provider. The unit 40 comprises at least one computer device with processing, storage and input/output units. The unit 40 further comprises communication equipment for communicating with the telecommunication network 60.

A third unit 70 is composed of a computer device in the form of a server at a payment service provider. The unit 70 comprises at least one computer device with processing, storage and input/output units. The unit 70 further comprises communication equipment for communicating with the telecommunication network 60.

A subsystem 50 for mobile communication represents the link between the mobile terminal 20 and the telecommunication network 60. The subsystem 50 consists of at least one base station in a mobile telephone network, together with equipment and services in a mobile telephone network which is normally run by a mobile telephone operator, in order to provide communication between the terminal 20 and the telecommunication network 60.

Figure 3:
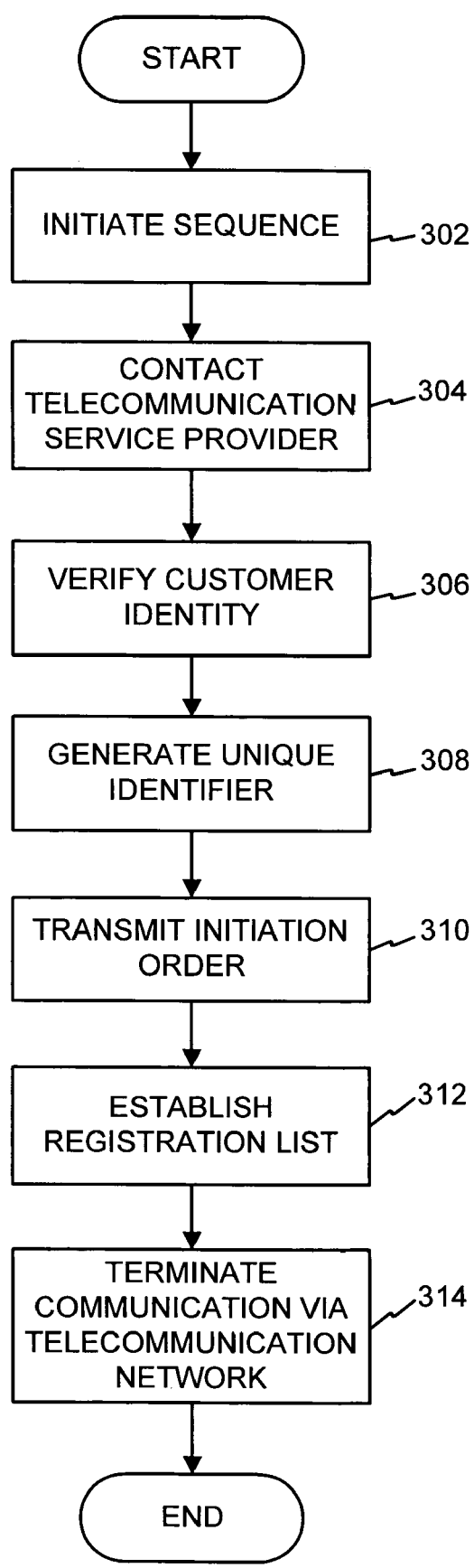
FIG. 3 is an exemplary flow diagram of a method for establishing a sequence for self-service shopping, consistent with an embodiment of the present invention.

Referring now to FIG. 3, a method for establishing a sequence 300 for self-service shopping will now be described, consistent with an embodiment of the present invention.

In this example the area 10 is assumed to be the area of a self-service shop.

When a customer arrives in the area 10, the customer indicates that he/she wishes to initiate a sequence for self-service shopping. Step 302. This is preferably implemented by the terminal 20 calling the unit 40 at a service provider by means of the mobile communication subsystem 50 and the telecommunicational network 60.

In particular, the sequence may be initiated by the terminal 20 being arranged to display a menu on the terminal's display, thus enabling the user, by means of a user interface in the terminal, to select a service which is linked to the method according to the invention. An identification of the shop location is then input to the terminal 20, preferably by the terminal reading a bar code which is made accessible to the customer on arrival at the shop, and which contains such an identification. The bar code will preferably also contain data representing a telephone subscription connected to the unit 40 at the service provider. On this basis, the terminal calls the unit 40 at the service provider through the telecommunication network 60. Step 304.

The unit 40, a computer device in the form of a server at the service provider, receives the call. The customer's identity, or more specifically the identity associated with the mobile telephone subscription employed by the customer, is received here by means of known techniques for subscriber number transfer. The received identity will normally comprise data contained in a subscriber identification module (SIM module) in the terminal 20. In the service provider unit 40 the received identity can be compared with and checked against reference data for the customer, which are stored at the service provider. Step 306.

If the identity is accepted by this check, the service provider unit 40 will provide a unique identification associated with the sequence concerned for shopping, information provision and payment/credit provision. Step 308. The identification comprises the received identity in addition to a unique number part, assigned and administered by the unit 40.

The central unit 30 in the shop receives through the telecommunication network 60 an initiation order from the unit 40 at the service provider. Step 310. The identification for the sequence is hereby received.

In an alternative embodiment, the terminal 20 can call the central unit 30 directly, instead of the call being routed via the unit 40 at the service provider. In this case the check of the customer's identity and the provision of the unique identification for the sequence will be performed in the unit 30 in the shop instead of in the unit 40 at the service provider. However, it is an advantage to use the unit 40 at the service provider for calling, identity check and providing the identification for the sequence, particularly if the unit 40 at the service provider serves several units 30 connected to different shops. Identity check and provision of identification for each sequence can then be performed at one and the same place.

After the central unit 30 has received the initiation order and provided or received the identification for the sequence, the central unit 30 establishes a registration list associated with the sequence. Step 312. The registration list is a list of items where each item at a minimum contains item identification data identifying a type of item covered by the sequence concerned. In addition, each item may contain other information which can be derived from the item identification data by inquiry in a database covered by the unit 30 or to which the unit 30 has access. The database contains inter alia information on the price of the goods. The registration list will advantageously also comprise a subtotal for the price of the goods, which at the end of the sequence represents the final total price.

When the registration list is established, the communication via the telecommunication network is terminated, and the further communication takes place by means of local Bluetooth communication between the unit 30 and the terminals 20 by means of the Bluetooth transceivers 31. Step 314. This communication is preferably initiated by the unit 30 transmitting an introductory message to the terminal, concerned 20. The terminal 20 is addressed in the Bluetooth network by means of the identity which was received by the unit 30 in the initiation order.

When the terminal 20 has received such an introductory message, it is ready to receive item identification data, i.e. data comprising information associated with an item or a type of item offered in the shop 10. The information will preferably be input into the terminal by means of the bar code reader 22, or by means of the keyboard 26 or another suitable input device. The terminal transmits the item identification data via the local Bluetooth network.

The unit 30 receives such item identification data by means of the Bluetooth transceiver 31.

If several Bluetooth transceivers 31 are provided in the area 10, the infrastructure in the Bluetooth network will be able to permit the unit 30 to register which part of the area 10 the terminal 20 is in at any time by determining which Bluetooth transceiver forms the coverage area in which the terminal is located. This information can be stored in the unit 30 and processed therein. Data derived from this processing can be transmitted to the unit at the service provider 40 and stored therein, and used to determine a preference profile for the customer in question. Such a preference profile may, for example, provide information on a customer's pattern of movement in the shop 10.

The goods identification data received by the unit 30 are used for inquiry in the database which provides information on inter alia the price of the item, as mentioned above.

The registration list is updated in the unit 30 by means of the item identification data received from the mobile communication unit 20, and also preferably by means of data from the above-mentioned inquiry in the database.

Data are then preferably transmitted from the inquiry in the database, especially information concerning the price of the item, and perhaps also the nature of the item, via the Bluetooth network to the terminal 20. The terminal 20 can then transmit a goods acknowledgement back to the unit 30 via the Bluetooth network, confirming that the item has to be included in the registration list. The goods acknowledgement is provided in the terminal 20 preferably by means of one, or alternatively several keystrokes on the terminal in response to a display of information concerning the price and/or nature of the item.

In an alternative embodiment the registration list may be updated without providing any such keystroke, the omission of such a keystroke for a given period after the unit's 30 receipt of the item identification data being considered to be a receipt of a goods acknowledgement.

At any point in the sequence the customer can transfer a termination order from the terminal 20 to the unit 30 via the Bluetooth network. The termination order is preferably activated by one, or alternatively several keystrokes on the terminal. Alternatively, the termination order is activated by the terminal 20 scanning a specific bar code identification, which may advantageously be provided on the printer device 32, where a receipt will subsequently be printed out. After having received such a termination order, the unit 30 will transfer data from the registration list to the terminal, particularly the subtotal price. The terminal will then display information associated with these data on the display.

The unit 30 will then receive a payment order from the terminal via the Bluetooth network. The payment order is preferably activated by means of one, or alternatively several keystrokes on the terminal. Such a payment order indicates that the customer wishes to terminate the shopping sequence and initiate a payment/credit transaction.

The unit 30 then performs a payment or credit transaction based on the updated registration list and the identification for the sequence. The payment or credit transaction can be undertaken in a number of known per se ways, or preferably as described below, where information associated with the customer's mobile telephone subscription in the terminal's SIM module is used for identification of the customer in the payment or credit transaction.

The unit 30 must first determine the desired method of payment. This may advantageously be performed by means of an inquiry in a database containing information on the known preferred form of payment of the customer concerned, if such data are available to the unit 30. This preferred form of payment will be proposed as first choice among the methods of payment offered to the customer. Data associated with various choices of form of payment are transmitted from the unit 30 to the terminal 20 via the Bluetooth network.

Alternatively or in addition, the terminal 20 may contain prestored preference data associated with the desired form of payment.

The unit 30 receives data associated with the chosen form of payment from the terminal 20 via the Bluetooth network.

The identification for the customer, which comes from the SIM module or the Bluetooth module in the terminal 20, may be used in a database in the unit 30 as a key for identifying an account number, credit card data or similar information which can identify the customer at the payment service provider, or more specifically in the unit 70.

The unit 30 now employs the telecommunication network 60 to transmit an inquiry concerning coverage for the amount concerned to the unit 70 at a payment service provider, and receives a reply to this inquiry from the unit 70 via the network 60.

On receiving confirmation, the unit 30 transmits a message concerning this to the terminal 20 via the Bluetooth network, and receives a charge acceptance from the terminal 20 via the Bluetooth network.

The unit 30 preferably activates the printer device 32, which prints out a receipt with information from the updated registration list for the sequence. The information preferably comprises the total price for the sequence and information concerning the payment/credit transaction, and if desired also information on each item included in the registration list.

In exceptional circumstances, for example if the Bluetooth local connection between the unit 30 and the terminal 20 is unexpectedly broken, if the inquiry to the payment service provider receives a negative reply, or in other unforeseen circumstances, the customer can employ an alternative, manual operation.

When the sequence is definitively concluded, i.e. after the transaction is completed and the terminal has lost contact the Bluetooth network, a confirmation of the terminated sequence is preferably transmitted to the unit 40 at the service provider. The number part of the identification employed for the sequence can thereby again be considered free for use by a new sequence.

The invention is described in the above by means of an example, with the additional description of individual alternatives.

As an alternative to the example where the area 10 is the area of a shop, the area 10 may be the area in the immediate vicinity of a vending machine, where the machine comprises at least one transceiver 31 for Bluetooth local communication, arranged for communication with mobile communication units carried by customers located in the vicinity of the vending machine. Information concerning an item offered by the machine is available from the outside of the machine, preferably in the form of a bar code identification, and can be input into the mobile communication unit.

In a further example the area 10 may be an area near a personal computer, where goods are offered to the user of the computer, for example via the Internet, and where the computer comprises at least one transceiver 31 for Bluetooth local communication. Information concerning an item offered via the computer is available from an arbitrary medium located in the area 10, usually in the form of a bar code identification which can be input into the mobile communication unit.

As an alternative or addition to the bar code reader 22 in the terminal 20, the information concerned 101, which in this case is advantageously in the form of numbers, is input by means of the keyboard 26. If this alternative is employed, the terminal 20 may be a known per se GSM mobile telephone equipped with a transceiver for Bluetooth local communication, and not necessarily with a bar code reader in addition.

The bar code reader may alternatively be a separate unit connected to the terminal 20, instead of forming an integrated part of the terminal 20.

The transceiver for Bluetooth communication may alternatively be a separate unit connected to the terminal 20 instead of forming an integrated part of the terminal 20.

The communication between the terminal 20 and the first central unit 30 may advantageously be based on WAP protocol (Wireless Application Protocol). This permits the use of WAP-based mobile telephones as terminal 20.

Instead of radio communication under the Bluetooth specification, use may be made of any other kind of local, wireless, two-way communication, where a number of terminals 20 can be addressed from at least one communication unit 31, including radio communication which does not fulfill the Bluetooth specification, or infrared or other optical communication.

Even though it is stated in the above description that a telecommunication network such as a GSM network 60 is employed for receiving the initiation order, it should be understood that the initiation may alternatively be undertaken by means of automatic functions in the local Bluetooth network, a unique identification in the Bluetooth network for the terminal 20 being recognised at the time when the terminal 20 is introduced into the Bluetooth network's coverage area. The actual initiation sequence may also be effected via the local Bluetooth network.

Those skilled in the art will appreciate that several possible embodiments and areas of application can be found within the scope of the invention as it is defined by the features set forth in the following claims and by their equivalents.

The invention claimed is:

1. A method for self-service shopping, comprising:
receiving, at a telecommunications service provider server, an initiation of a sequence of self-service shopping transmitted over a communication network by a portable terminal;
determining, at the telecommunications service provider server, an identity of a customer using the portable terminal;
assigning a unique identifier to the sequence of self-service shopping by the customer;
receiving, at a shop server in a shop location, an initiation order from the telecommunications service provider, wherein the initiation order includes the unique identifier;
establishing, at the shop server, a registration list associated with the initiation order; and
responsive to establishing the registration list, terminating communication between the portable terminal and the telecommunications service provider over the communication network, and establishing communication between the portable terminal and the shop server over a local network.

2. The method of claim 1, wherein the initiation includes an identification of the shop location and data representing a telephone subscription for the shop location.

3. The method of claim 1, further comprising:
receiving, at the shop server, item identification data; and
determining, at the shop server, a price of an item identified by the item identification data.

4. The method of claim 3, wherein the item identification data is read by a bar code reader attached to the portable terminal and transmitted from the portable terminal to the shop server.

5. The method of claim 3, further comprising:
transmitting, from the shop server, a price of the item to the portable terminal; and
receiving, at the shop server, an acknowledgement indicating consent of the customer to purchase the item.

6. The method of claim 3, further comprising:
receiving, at the shop server, a payment order from the portable terminal;
transmitting, to a payment service provider server, an inquiry concerning coverage for an amount specified in the payment order; and
receiving, at the shop server, a confirmation from the payment service provider server.

7. The method of claim 1, wherein communication between the portable terminal and the shop server over the local network comprises communication by Bluetooth.

8. A system for self-service shopping, the system comprising:
a telecommunications service provider server configured to receive an initiation of a sequence of self-service shopping transmitted over a communication network by a portable terminal, to determine an identity of a customer using the portable terminal, to assign a unique identifier to the sequence of self-service shopping by the customer, and to generate an initiation order containing the unique identifier; and
a shop server in a shop location, the shop server configured to receive the initiation order from the telecommunications service provider server, and to establish a registration list associated with the initiation order;
wherein in response to establishing the registration list, communication between the portable terminal and the telecommunications service provider is terminated, and communication between the portable terminal and the shop server over a local network is established.

9. The system of claim 8, wherein the initiation includes an identification of the shop location and data representing a telephone subscription for the shop location.

10. The system of claim 8, wherein the server further receives item identification data and determines a price of an item identified by the item identification data.

11. The system of claim 10, wherein the item identification data is read by a bar code reader attached to the portable terminal and transmitted from the portable terminal to the shop server.

12. The system of claim 10, wherein the shop server further transmits a price of the item to the portable terminal and receives an acknowledgement indicating consent of the customer to purchase the item.

13. The system of claim 10, wherein the shop server further receives a payment order from the portable terminal, transmits, to a payment service provider server, an inquiry concerning coverage for an amount specified in the payment order, and receives a confirmation from the payment service provider server.

14. The system of claim 8, wherein communication between the portable terminal and the shop server over the local network comprises communication by Bluetooth.

15. A computer-readable medium storing program instructions executable by a processor that implement a method for self-service shopping, the method comprising:
receiving, at a telecommunications service provider server, an initiation of a sequence of self-service shopping transmitted over a communication network by a portable terminal;
determining, at the telecommunications service provider server, an identity of a customer using the portable terminal;
assigning a unique identifier to the sequence of self-service shopping by the customer;
receiving, at a shop server in a shop location, an initiation order from the telecommunications service provider, wherein the initiation order includes the unique identifier;
establishing, at the shop server, a registration list associated with the initiation order; and
responsive to establishing the registration list, terminating communication between the portable terminal and the telecommunications service provider server over the communication network, and establishing communication between the portable terminal and the shop server over a local network.

16. The computer-readable medium of claim 15, wherein the initiation includes an identification of the shop location and data representing a telephone subscription for the shop location.

17. The computer-readable medium of claim 15, further comprising:
receiving, at the shop server, item identification data; and
determining, at the shop server, a price of an item identified by the item identification data.

18. The computer-readable medium of claim 17, wherein the item identification data is read by a bar code reader attached to the portable terminal and transmitted from the portable terminal to the shop server.

19. The computer-readable medium of claim 17, further comprising:
transmitting, from the shop server, a price of the item to the portable terminal; and
receiving, at the shop server, an acknowledgement indicating consent of the customer to purchase the item.

20. The computer-readable medium of claim 17, further comprising:
receiving, at the shop server, a payment order from the portable terminal;
transmitting, to a payment service provide server, an inquiry concerning coverage for an amount specified in the payment order; and
receiving, at the shop server, a confirmation from the payment service provider server.

21. The computer-readable medium of claim 15, wherein communication between the portable terminal and the shop server over the local network comprises communication by Bluetooth.

* * * * *